United States Patent
Ingels

(10) Patent No.: US 9,069,226 B2
(45) Date of Patent: Jun. 30, 2015

(54) THERMALLY STABILISED RESONANT ELECTRO-OPTIC MODULATOR AND USE THEREOF

(71) Applicant: IMEC, Leuven (BE)

(72) Inventor: Mark Maria Albert Ingels, Boutersem (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 14/104,889

(22) Filed: Dec. 12, 2013

(65) Prior Publication Data

US 2014/0169724 A1 Jun. 19, 2014

(30) Foreign Application Priority Data

Dec. 14, 2012 (EP) .................................... 12197140

(51) Int. Cl.
| | |
|---|---|
| G02F 1/29 | (2006.01) |
| G02B 6/293 | (2006.01) |
| G02F 1/03 | (2006.01) |
| G02F 1/313 | (2006.01) |
| G02B 6/12 | (2006.01) |

(52) U.S. Cl.
CPC .............. *G02F 1/29* (2013.01); *G02B 6/29338* (2013.01); *G02B 6/29398* (2013.01); *G02F 1/0327* (2013.01); *G02F 1/3132* (2013.01); *G02B 6/12007* (2013.01); *G02B 6/29341* (2013.01); *G02F 2203/15* (2013.01); *G02F 2203/21* (2013.01)

(58) Field of Classification Search
CPC .................. G02B 6/29341; G02B 6/29338
USPC ...................................... 385/5, 9, 32
See application file for complete search history.

(56) References Cited

U.S. PATENT DOCUMENTS

| | | | |
|---|---|---|---|
| 6,104,851 A * | 8/2000 | Mahgerefteh ................ | 385/37 |
| 6,411,752 B1 * | 6/2002 | Little et al. ................ | 385/17 |
| 7,970,244 B2 * | 6/2011 | Krug et al. ................ | 385/32 |
| 8,009,937 B2 * | 8/2011 | Mathai et al. ................ | 385/2 |
| 2007/0071394 A1 * | 3/2007 | Faccio et al. ................ | 385/131 |
| 2009/0169149 A1 | 7/2009 | Block | |
| 2010/0111462 A1 * | 5/2010 | Bratkovski et al. ............ | 385/2 |
| 2010/0254416 A1 * | 10/2010 | Suzuki ........................ | 372/20 |
| 2011/0293216 A1 * | 12/2011 | Lipson et al. ................ | 385/14 |
| 2012/0057815 A1 * | 3/2012 | Ezaki et al. .................. | 385/3 |
| 2013/0037692 A1 * | 2/2013 | Akiyama .................. | 250/201.1 |

OTHER PUBLICATIONS

European Search Report, European Patent Application 12197140.2, dated May 23, 2013.
Lentine, Anthony L. et al., "Active Wavelength Control of Silicon Microphotonic Resonant Modulators", Optical Interconnects Conference, May 20, 2012, pp. 46-47.

(Continued)

*Primary Examiner* — Charlie Y Peng
(74) *Attorney, Agent, or Firm* — McDonnell Boehnen Hulbert & Berghoff LLP

(57) ABSTRACT

Thermally stabilized resonant electro-optic modulator (1), wherein the temperature control unit (8) is provided for separately determining the first and the second intensities measured by the light sensor (6) at the first voltages and the second voltages respectively in function of time.

20 Claims, 1 Drawing Sheet

(56) References Cited

OTHER PUBLICATIONS

Zortman, William A., "Integrated CMOS Compatible Low Power 10Gbps Silicon Photonic Heater-Modulator", Optical Fiber Communication Conference and Exposition (OFC/NFOEC), 2012 and the National Fiber Optic Engineers Conference, IEEE, Mar. 4, 2012, pp. 1-3.

Van Campenhout, Joris et al., "Low-Voltage, Low-Loss, Multi-Gb/s Silicon Micro-Ring Modulator Based on a MOS Capacitor", Communication Conference, OSA Technical Digest (Optical Society of America, 2012), paper OM2E.4, pp. 1-3.

* cited by examiner

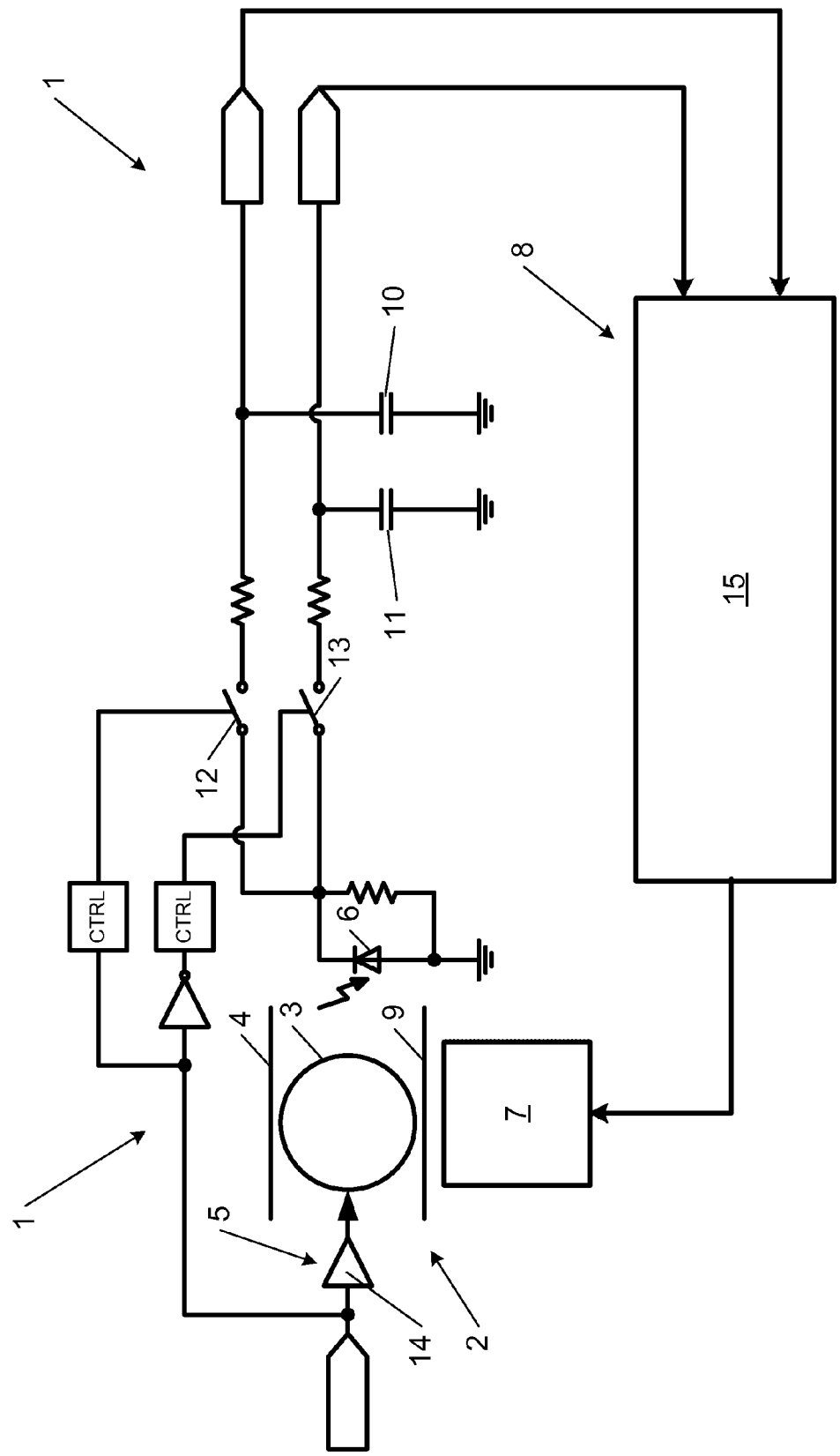

THERMALLY STABILISED RESONANT ELECTRO-OPTIC MODULATOR AND USE THEREOF

CROSS-REFERENCE TO RELATED APPLICATIONS

This application claims the benefit of priority of European Patent Application no. 12197140.2, filed Dec. 14, 2012, which is hereby incorporated herein by reference in its entirety.

TECHNICAL FIELD

The present disclosure relates to a thermally stabilised resonant electro-optic modulator and the use thereof.

BACKGROUND ART

It is expected that optical communications will significantly gain in importance as they allow for further increasing the communication speed and bandwidth for microscopic applications, such as chips, and allow further reduction of the footprint of such applications. To transform an electric signal to an optical signal an optical modulator is used, for example a resonant electro-optic modulator as described in *Low voltage, Low-Loss, Multi-Gb/s Silicon Micro-Ring Modulator based on a MOS Capacitor* by Joris Van Campenhout, Marianne Pantouvaki, Peter Verheyen, Shankar Selvaraja, Guy Lepage, Hui Yu, Willie Lee, Johan Wouters, Danny Goossens, Myriam Moelants, Wim Bogaerts and Philippe Absil in "The Optical Fiber Communication Conference and Exposition (OFC) and The National Fiber Optic Engineers Conference (NFOEC) 2012", United States, p.OM2E (2012).

However, although such modulators may have very good characteristics with respect to conversion speed, power usage and footprint, their output for a given wavelength depends relatively heavily on their operating temperature.

*Active wavelength control of Silicon microphotonic resonant modulators* by Anthony L. Lentine, W. A. Zortman, D. C. Trotter and Michael R. Watts published in "Optical Interconnects Conference, 2012 IEEE" describes a thermally stabilised resonant electro-optic modulator for optical communication purposes of binary data. The modulator comprises a resonant electro-optic modulator unit. The resonant electro-optic modulator unit comprises a first ring-shaped waveguide and a second longitudinal waveguide adjacent to the first waveguide. The thermally stabilised resonant electro-optic modulator further comprises a voltage unit for applying a first and a second voltage over the ring-shaped waveguide, a light sensor for determining the intensity of the light transmitted through the second waveguide after having passed along the first waveguide, a thermal stabilisation unit for adjusting the temperature of the first waveguide and a temperature control unit for controlling the thermal stabilisation unit in response to a signal representing the intensity measured by the light sensor. The first and the second waveguides are arranged such that light with a wavelength transmitted through the second waveguide is differently attenuated by resonance in the first waveguide by application of either the first or the second voltage allowing a higher throughput of light with that wavelength through the second waveguide along the first waveguide at the first voltage, thus representing a 1-bit, than at the second voltage, thus representing a 0-bit. A third waveguide is provided adjacent to the first waveguide, the first and the third waveguides being arranged such that light transmitted through the first waveguide is attenuated by resonance in the third waveguide. Such a third waveguide usually is called a drop port. The light sensor is provided to measure the intensity of the light transmitted through the second waveguide as a result of attenuation into the third waveguide from the first waveguide. Based on the measured intensity by the light sensor, a decision is made whether the intensity of the light as measured by the light sensor represents a 0-bit or a 1-bit. Further the thus measured bits are compared with the original bits as originally supplied to the modulator unit, more in particular the first waveguide, in the form of the first and the second voltage. Depending on the difference in between the measured bits and the original bits, the temperature control unit controls the thermal stabilisation unit.

However, in such configuration an additional transformation is needed in the form of the decision whether the output of the light sensor represents a 0-bit or a 1-bit. This additional transformation requires additional electrical components which are often relatively complicated, require additional power and make the thermally stabilised resonant electro-optic modulator more prone to malfunctions. Moreover, in order to achieve high data transmission speed, high speed computation components are for exampled required for making the decision whether the output of the light sensor represents a 0-bit or a 1 bit or for example for comparing the bits as measured and the bits as originally supplied to the modulator unit.

SUMMARY OF THE DISCLOSURE

In certain aspects, the disclosure provides a thermally stabilised resonant electro-optic modulator which allows controlling the thermal stabilisation unit based on the output and the original input of the modulator which is less complicated.

For example, one aspect of the disclosure relates to a thermally stabilised resonant electro-optic modulator, comprising a resonant electro-optic modulator unit, the resonant electro-optic modulator unit comprising a first ring-shaped waveguide and a second longitudinal waveguide adjacent to the first waveguide, a voltage unit for applying a first and a second voltage over the first ring-shaped waveguide, the first and the second waveguides being arranged such that light with a wavelength transmitted through the second waveguide is differently attenuated by resonance in the first waveguide by application of either the first or the second voltage allowing a higher throughput of light with that wavelength through the second waveguide along the first waveguide at the first voltage than at the second voltage, a light sensor provided to measure the intensity of the light transmitted through the second waveguide after having passed along the first waveguide, a thermal stabilisation unit for adjusting the temperature of the first waveguide and a temperature control unit for controlling the thermal stabilisation unit in response to a signal representing the intensity measured by the light sensor, characterised in that the temperature control unit is provided for separately determining the first and the second intensities measured by the light sensor at the first voltages and the second voltages respectively in function of time.

In other aspects, the present disclosure provides a use of such thermally stabilised resonant electro-optic modulator.

For example, one aspect of the disclosure relates to use of the thermally stabilised resonant electro-optic modulator as described herein, wherein light having at least one wavelength is transmitted through the second waveguide along the first waveguide and wherein first and second voltages are applied over the first ring-shaped waveguide for attenuating the light transmitted through the second waveguide in correspondence with the applied first and/or the second voltages.

Notably, in certain aspects the temperature control unit is provided for separately determining the first and the second intensities measured by the light sensor at the first voltages and the second voltages respectively in function of time.

By directly measuring the first and the second intensities measured by the light sensor at the first and the second in function of time, it has been found that a decision on whether the measured intensity by the light sensor represents a 0-bit or a 1-bit is no longer necessary.

Moreover, it has been found that a very accurate determination of whether the device functions as desired or not is achieved.

Moreover, according to the present disclosure, the first and second intensities can now be more directly monitored, different desired operating conditions, such as insertion loss (IL) (which is the loss of intensity of the light transmitted through the second waveguide because of attenuation at the first voltage), extinction rate (ER) (which is the difference between the first and the second intensity), etc. can now more easily be set without having to calibrate them to a certain operating temperature for the second waveguide as it has become possible to monitor whether the respective measured first and second intensities go up or down. When observing typical transmission spectra for various applied voltages in function of the wavelength (such as for example in FIG. 2a of the earlier cited *Low voltage, Low-Loss, Multi-Gb/s Silicon Micro-Ring Modulator based on a MOS Capacitor*) it can be seen that such spectra have a typical minimum at a certain wavelength. *Active wavelength control of Silicon microphotonic resonant modulators* by Anthony L. Lentine, W. A. Zortman, D. C. Trotter and Michael R. Watts published in "Optical Interconnects Conference, 2012 IEEE" describes, for example in FIG. 1b, that a shift in wavelength actually can be related to a shift in temperature and that therefore the response in function of wavelength is very similar to, if not the same as, the response in function of temperature. When only monitoring the first or the second measured intensity, when the intensity varies due to a change in temperature, it is not clear whether the temperature either rises or declines depending on which side of the minimum the temperature is situated as for example illustrated in FIG. 1b of *Active wavelength control of Silicon microphotonic resonant modulators* by Anthony L. Lentine, W. A. Zortman, D. C. Trotter and Michael R. Watts published in "Optical Interconnects Conference, 2012 IEEE". When monitoring both the first and the second measured intensities at the first and the second voltage, it becomes possible to defer from both measured intensities at which side of the minima of the response in function of temperature at the first and the second voltages the temperature is situated and therefore whether the second waveguide needs to be heated or needs to be cooled.

Moreover, it has been found that since the first and the second intensities are separately measured, as opposed to for example a value representing a mean value based on the two intensities, it has been found that the modulator can operate as desired, even when the number of first and second voltages is not substantially equal, for example when the first and the second voltage represent bits of a binary signal with the binary signal having a substantially different number of 1-bits and 0-bits.

In certain embodiments according to the present disclosure, the control unit is provided to compare the first and the second intensities with a respective first and second threshold value, the second threshold value being different from the first threshold value. For example, the first intensity can be kept under a first threshold while keeping the second intensity above a second threshold by changing the temperature of the second waveguide. Alternatively, the first intensity can be kept above a first threshold while keeping the second intensity under a second threshold by changing the temperature of the second waveguide. In addition other thresholds are for example possible such as monitoring the insertion loss (IL) and the extinction ratio (ER).

In certain embodiments according to the present disclosure, the temperature control unit is provided to control the thermal stabilisation unit in response to the separate changes in function of time of the first and the second measured intensities respectively.

In certain embodiments according to the present disclosure, the thermally stabilised resonant electro-optic modulator, more in particular the electro-optic modulator unit, comprises a third waveguide provided adjacent to the first waveguide, the first and the third waveguides being arranged such that light transmitted through the first waveguide is attenuated by resonance in the third waveguide. Such third waveguide is also called a drop port as opposed to the part of the second waveguide positioned after the first waveguide along travel direction of the light transmitted along the second waveguide which is often called the through port.

According to further embodiments of the current disclosure, the light sensor is provided to measure the intensity of the light transmitted through the third waveguide as a result of attenuation into the third waveguide from the first waveguide. In such configuration, it is avoided to deflect light from the second waveguide into the light sensor in order to measure the first and the second intensities. This way, the light being attenuated for further use can for example retain its full intensity such as to improve signal to noise ratio and possible range over which the light can be transmitted over the second waveguide.

In certain embodiments according to the present disclosure, the temperature control unit is provided to determine the extinction rate (ER) and/or insertion loss (IL). As discussed above these can be directly used as the first and the second threshold respectively, but can also be used as additional parameters next to the first and the second threshold.

In certain embodiments according to the current disclosure, the light sensor is provided to transform optical power to a potential difference, for example with respect to the ground or a zero potential, to determine the intensity of the light transmitted through the second waveguide after having passed along the first waveguide. Such a light sensor for example comprises a photodiode. As discussed above the light sensor can be provided to measure the intensity of light from the third waveguide, if present, or alternatively, or even in combination, the second waveguide.

In further embodiments of the current disclosure, the modulator comprises at least one capacitor configured such that the energy corresponding to the potential difference generated by the light sensor is stored on the capacitor, the temperature control unit being connected to the capacitor and as such being provided to control the thermal stabilisation unit based on the energy stored on the capacitor.

In further embodiments of the current disclosure, the modulator comprises at least two capacitors, a first capacitor configured such as to store the first energy corresponding to the potential difference measured by the light sensor when the first voltage is applied to the first waveguide and a second capacitor respectively configured such as to store the second energy corresponding to the potential difference measured by the light sensor when the second voltage is applied to the first waveguide, the temperature control unit being connected to the first and the second capacitor. By using such capacitor(s) it becomes possible to more easily monitor the operating conditions of the first waveguide as the energy stored on a capacitor is relatively easy to read out as the use of high speed electronics can for example be avoided.

In further embodiments of the current disclosure, the modulator comprises a respective first and a second switch, the first switch being configured such as to close when the first voltage is applied such that the first energy is stored on the first capacitor and the second switch being configured such as to close when the second voltage is applied such that the second energy is stored on the second capacitor. Such embodiment allows, using relative simple straightforward electrical components, to nevertheless provide a thermally stabilised resonant electro-optic modulator.

The disclosure also relates to use of the thermally stabilised resonant electro-optic modulator according to the current disclosure. According to such use light having at least one wavelength is transmitted through the second waveguide along the first waveguide and wherein first and second voltages are applied over the ring-shaped waveguide for attenuating the light transmitted through the second waveguide in correspondence with the applied first and/or the second voltages.

In certain embodiments according to the current disclosure, the first and the second voltage represent bits of a binary signal. In further embodiments according to the current disclosure, although not critical for the disclosure, the first voltage represents a 1-bit and the second voltage represents a 0-bit.

In certain embodiments according to the current disclosure, light having at least two wavelengths is transmitted through the second waveguide along the first waveguide. In such use, wave division multiplexing becomes possible such that a single waveguide can be used to send different signals in a parallel way.

In certain embodiments according to the current disclosure, the thermally stabilised resonant electro-optic modulator according to the disclosure is used for optical communication.

In certain embodiments according to the current disclosure, the light has a wavelength of about 1531.7 nm.

BRIEF DESCRIPTION OF THE DRAWINGS

The disclosure will be further elucidated by means of the following description and the appended figures.

FIG. 1 shows a schematic overview of an embodiment of the thermally stabilised resonant electro-optic modulator according to the present disclosure.

DETAILED DESCRIPTION OF PREFERRED EMBODIMENTS

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

1. Thermally stabilised resonant electro-optic modulator
2. Resonant electro-optic modulator unit
3. First ring-shaped waveguide
4. Second longitudinal waveguide
5. Voltage unit
6. Light sensor
7. Thermal stabilisation unit
8. Temperature control unit
9. Third waveguide
10. First capacitor
11. Second capacitor
12. First switch
13. Second switch
14. Amplifier
15. Temperature control processor FIG. 1 shows a schematic overview of an embodiment of the thermally stabilised resonant electro-optic modulator 1 according to the present disclosure.

The resonant electro-optic modulator 1 shown in FIG. 1 comprises a resonant electro-optic modulator unit 2. The resonant electro-optic modulator unit 2 comprises a first ring-shaped waveguide 3 and a second longitudinal waveguide 4 adjacent to the first waveguide 3. The resonant electro-optic modulator 1 further comprises a voltage unit 5 for applying a first and a second voltage over the first ring-shaped waveguide 3. The first and the second waveguides 3, 4 are arranged such that light with a wavelength transmitted through the second waveguide 4 is differently attenuated by resonance in the first waveguide 3 by application of either the first or the second voltage allowing a higher throughput of light with that wavelength through the second waveguide 4 along the first waveguide 3 at the first voltage than at the second voltage. Further, a light sensor 6 is provided to the resonant electro-optic modulator 1 for determining the intensity of the light transmitted through the second waveguide 4 after having passed along the first waveguide 3. A thermal stabilisation unit 7 of the resonant electro-optic modulator 1 is provided for adjusting the temperature of the first waveguide 3 and a temperature control unit 8 for controlling the thermal stabilisation unit 7 in response to a signal representing the intensity measured by the light sensor 6.

An example of such electro-optic modulator unit and a method for fabricating such modulator unit 2 is for example described in *Low voltage, Low-Loss, Multi-Gb/s Silicon Micro-Ring Modulator based on a MOS Capacitor* by Joris Van Campenhout, Marianne Pantouvaki, Peter Verheyen, Shankar Selvaraja, Guy Lepage, Hui Yu, Willie Lee, Johan Wouters, Danny Goossens, Myriam Moelants, Wim Bogaerts and Philippe Absil in "The Optical Fiber Communication Conference and Exposition (OFC) and The National Fiber Optic Engineers Conference (NFOEC) 2012", United States, p.OM2E (2012) (further referenced as "Van Campenhout et al."), which is hereby incorporated herein by reference in its entirety. Of course other embodiments deemed appropriate by the person skilled but using other materials, dimensions, etc. in the art are also possible.

As can be seen in FIG. 1, a third waveguide 9 preferably is provided adjacent to the first waveguide 3, the first and the third waveguides 3, 9 being arranged such that light transmitted through the first waveguide 3 is attenuated by resonance in the third waveguide 9. Such a third waveguide is for example also described in Van Campenhout et al.

As can be further seen in FIG. 1, the light sensor 6 is provided to measure the intensity of the light transmitted through the third waveguide 9 as a result of attenuation into the third waveguide 9 from the first waveguide 3. However, as discussed above, it is also possible to deflect light from the second waveguide 4 into the light sensor in order to measure the first and the second intensities.

It can further be seen that the light sensor 6 is provided to transform optical power to a potential difference to determine the intensity of the light transmitted through the second waveguide 4 after having passed along the first waveguide 3. Such a light sensor 6 for example is a photodiode.

Further, the modulator 1 shown in FIG. 1 comprises at least one capacitor 10 configured such that the energy corresponding to the potential difference generated by the light sensor 6 is stored on the capacitor 10, the temperature control unit 8 being connected to the capacitor 10. More in particular, the modulator 1 comprises at least two capacitors 10, 11, a first capacitor 10 configured such as to store the first energy corresponding to the potential difference measured by the light sensor 6 when the first voltage is applied to the first waveguide 3 and a second capacitor 11 respectively configured such as to store the second energy corresponding to the potential difference measured by the light sensor 6 when the second voltage is applied to the first waveguide 3. The temperature control unit 8 is connected to the first and the second capacitor 10, 11.

In order to get the first energy on the first capacitor 10 and the second energy on the second capacitor 11, the modulator 1 according to FIG. 1 comprises a respective first and a second switch 12, 13. The first switch 12 being is configured such as to close when the first voltage is applied such that the first energy is stored on the first capacitor 10 and the second switch 13 is configured such as to close when the second voltage is applied such that the second energy is stored on the second capacitor 11. Although the switches 12, 13 are represented as mechanical switches, which are closed/opened based on the data transmitted along their corresponding control units, this is a mere schematic representation and other embodiments are of course possible using for example transistors such as for example CMOS transistors.

In operation, for example a stream of electrical binary data, an electrical binary signal, will need to be converted to an optical signal. Thereto, the stream of binary data will be presented as a stream of different voltages, the different voltages representing the different bits of the stream of electrical binary data.

The stream of binary data will be presented to the thermally stabilised resonant electro-optic modulator 1 according to the invention, for example the thermally stabilised resonant electro-optic modulator 1 as shown in FIG. 1 and the voltages representing the bits of the electrically binary signal will then, for example, be amplified by the amplifier 14 to the first and the second voltages which will then be applied over the first waveguide 3. At the same time light having at least one wavelength is transmitted through the second waveguide 4 along the first waveguide 3. Therefore, the first and second voltages applied over the first ring-shaped waveguide 3 will attenuate the light transmitted through the second waveguide 4 in correspondence with the applied first and the second voltages and thus in accordance with the electrical binary signal, allowing a higher throughput of light with that wavelength through the second waveguide 4 along the first waveguide 3 at the first voltage than at the second voltage. The electrical binary signal in other words has been converted to an optical signal and transmitted over the second waveguide 4. It can be desired that the optical signal is then again transformed into an electric signal. This can for example be done, even independent from how the optical signal has been formed with the thermally stabilised resonant electro-optic modulator 1 according to the invention or not, using a thermally stabilised resonant electro-optic modulator 1 according to the invention which has been modified mutatis-mutandis.

To verify whether the first waveguide 3 operates as desired and the electrical binary signal is correctly transformed into an optical signal, for example, the first and second intensities as measured by light sensor 6 are stored in the form of energy stored on the capacitors 10, 11 to respectively store the respective first and second energies. Thereto, FIG. 1 shows schematically that the first and the second switch are operated using the original electrical binary signal, a 1-bit for example closing the first switch and a 0-bit for example closing the second switch or a 0-bit for example closing the first switch and a 1-bit for example closing the second switch. In FIG. 1 a NOT-gate schematically illustrates that a 0-bit, although usually represented by a low voltage, nevertheless is converted into a relatively high voltage such that the switch can be operated and such that the first and the second energies are transferred to the respective capacitor.

FIG. 1 further shows schematically that the temperature control unit 8 comprises a temperature control processor 15 which is configured such as to control the thermal stabilisation unit 7 depending on the energies stored on the capacitors 10, 11 and measured by the temperature control unit 8. The thermal stabilisation unit 7 can for example be a heater as for example described in Van Campenhout et al.

For example, the control unit 8, more in particular the temperature control processor 15, is provided to compare the first and the second intensities with a respective first and second threshold value, the second threshold value being different from the first threshold value.

Preferably, the temperature control unit 8 is provided to control the thermal stabilisation unit 7 in response to the separate changes in function of time of the first and the second measured intensities respectively.

Preferably, the temperature control unit 8 is provided to determine the extinction rate and/or insertion loss, for example being the first and the second threshold. Preferably, however the first and the second threshold value are specific desired intensities for the respective first and the second intensity.

The invention claimed is:

1. A thermally stabilised resonant electro-optic modulator for providing a binary modulated light signal having a wavelength, the modulated light optical signal comprising a plurality of 1-bits and a plurality of 0-bits, the modulator comprising:
- a resonant electro-optic modulator unit, the resonant electro-optic modulator unit comprising a first ring-shaped waveguide and a second longitudinal waveguide adjacent to the first waveguide,
- a voltage unit configured to apply a first voltage or a second voltage over the first ring-shaped waveguide, the first and the second waveguides being arranged such that light with the wavelength transmitted through the second waveguide is differently attenuated by resonance in the first waveguide by application of either the first or the second voltage allowing a substantially higher throughput of light with the wavelength through the second waveguide along the first waveguide at the first voltage than at the second voltage, the first voltage corresponding to one of a 0-bit or a 1-bit of the modulated optical signal, the second voltage corresponding to the other of a 0-bit and a 1-bit of the modulated optical signal,
- a light sensor configured to determine the intensity of the light transmitted through the second waveguide after having passed along the first waveguide,
- a thermal stabilisation unit configured to adjust the temperature of the first waveguide and
- a temperature control unit configured to control the thermal stabilisation unit in response to a signal representing the intensity measured by the light sensor,
- wherein the temperature control unit is configured to receive
  - a first signal from the light sensor corresponding to a first intensity of the light transmitted through the second waveguide after having passed along the first waveguide, determined when the voltage unit applies the first voltage, and
  - a second signal from the light sensor corresponding to a second intensity of the light transmitted through the second waveguide after having passed along the first waveguide, determined when the voltage unit applies the second voltage,
  - the first signal being received by the temperature control unit as a function of time, and
  - the second signal being received by the temperature control unit as a function of time separately from the first signal, and
- wherein the temperature control unit is configured to control the thermal stabilisation unit in response to separate changes in the first signal as a function of time and the second signal as a function of time.

2. A thermally stabilised resonant electro-optic modulator as claimed in claim 1, wherein the control unit is configured to compare the first and the second intensities with a respective first and second threshold value, the second threshold value being different from the first threshold value.

3. A thermally stabilised resonant electro-optic modulator as claimed in claim 1, wherein the resonant electro-optic modulator unit further comprises a third waveguide is disposed adjacent to the first waveguide, the first and the third waveguides being arranged such that light transmitted through the first waveguide is coupled into the third waveguide, and wherein the light sensor is configured to measure the intensity of the light transmitted by the third waveguide in order to determine the intensity of the light transmitted through the second waveguide after having passed along the first waveguide.

4. A thermally stabilised resonant electro-optic modulator as claimed in claim 1, wherein the temperature control unit is configured to determine the extinction rate and/or insertion loss of the light transmitted through the second waveguide.

5. A thermally stabilised resonant electro-optic modulator as claimed in claim 1, wherein the light sensor is configured to transform a measured optical intensity to a potential difference to determine the intensity of the light transmitted through the second waveguide after having passed along the first waveguide.

6. A thermally stabilised resonant electro-optic modulator as claimed in claim 5, wherein the modulator comprises at least one capacitor configured such that the energy corresponding to the potential difference generated by the light sensor is stored on the capacitor, the temperature control unit being connected to the capacitor.

7. A thermally stabilised resonant electro-optic modulator as claimed in claim 5, wherein the modulator further comprises
- a first capacitor configured to store a first energy corresponding to the potential difference measured by the light sensor when the first voltage is applied to the first waveguide, and
- a second capacitor configured to store a second energy corresponding to the potential difference measured by the light sensor when the second voltage is applied to the first waveguide,
- wherein the temperature control unit is separately connected to the first and the second capacitor.

8. A thermally stabilised resonant electro-optic modulator as claimed in claim 7, wherein the modulator further comprises
- a first switch configured to close only when the first voltage is applied in order to connect the light sensor to the first capacitor such that the first energy is stored on the first capacitor, and
- a second switch configured to close only when the second voltage is applied in order to connect the light sensor to the second capacitor such that the second energy is stored on the second capacitor.

9. A thermally stabilised resonant electro-optic modulator as claimed in claim 5 wherein the light sensor is configured to measure the intensity of the light transmitted by the third waveguide and to transform that measured intensity to a potential difference in order to determine the intensity of the light transmitted through the second waveguide after having passed along the first waveguide.

10. A method for providing a binary modulated light signal having a wavelength, the binary modulated optical signal comprising a plurality of 1-bits and a plurality of 0-bits the method, comprising
- providing a thermally stabilised resonant electro-optic modulator comprising
  - a resonant electro-optic modulator unit, the resonant electro-optic modulator unit comprising a first ring-shaped waveguide and a second longitudinal waveguide adjacent to the first waveguide,
  - a voltage unit configured to apply a first voltage or a second voltage over the first ring-shaped waveguide, the first and the second waveguides being arranged such that light with the wavelength transmitted through the second waveguide is differently attenuated by resonance in the first waveguide by application of either the first or the second voltage allowing a substantially higher throughput of light with the wavelength through the second waveguide along the first waveguide at the first voltage than at the second voltage, the first voltage corresponding to one of a 0-bit or a 1-bit of the modulated optical signal, the second voltage corresponding to the other of a 0-bit or a 1-bit of the modulated optical signal, a light sensor configured to determine the intensity of the light transmitted through the second waveguide after having passed along the first waveguide, a thermal stabilisation unit configured to adjust the temperature of the first waveguide, and a temperature control unit configured to control the thermal stabilisation unit in response to a signal representing the intensity measured by the light sensor, transmitting light having one the wavelength through the second waveguide along the first waveguide;

applying a sequence of first and second voltages over the first ring-shaped waveguide, thereby attenuating the light transmitted through the second waveguide in correspondence with the applied first and/or the second voltages;

determining, using the light sensor, the intensity of the light transmitted through the second waveguide after having passed along the first waveguide;

providing to the temperature control unit a first signal from the light sensor corresponding to a first intensity of the light transmitted through the second waveguide after having passed along the first waveguide, determined when the voltage unit applies the first voltage, the first signal being provided as a function of time during which the first voltage is applied;

separately providing to the temperature control unit a second signal from the light sensor corresponding to a second intensity of the light transmitted through the second waveguide after having passed along the first waveguide, determined when the voltage unit applies the second voltage being provided as a function of time during which the first voltage is applied; and controlling the thermal stabilisation unit with the temperature control unit, in response to separate changes in the first signal as a function of time and the second signal as a function of time.

11. A method according to claim 10, wherein light having at least two wavelengths is transmitted through the second waveguide along the first waveguide.

12. A method according to claim 10, wherein the controlling the thermal stabilisation unit includes comparing the first intensity with a first threshold value, comparing the second intensity with a second threshold value different from the first threshold value.

13. A method according to claim 12, further comprising controlling the thermal stabilisation unit such that the first intensity remains above the first threshold value, and the second intensity remains below the second threshold value.

14. A method according to claim 10, wherein the resonant electro-optic modulator unit further comprises a third waveguide is disposed adjacent to the first waveguide, the first and the third waveguides being arranged such that light transmitted through the first waveguide is coupled into the third waveguide, and wherein the determining the intensity of the light transmitted through the second waveguide after having passed along the first waveguide is performed by measuring the intensity of light transmitted by the third waveguide.

15. A method according to claim 10, wherein the temperature control unit determines the extinction rate and/or insertion loss of the light transmitted through the second waveguide.

16. A method according to claim 10, wherein the light sensor transforms a measured optical intensity to a potential difference to determine the intensity of the light transmitted through the second waveguide after having passed along the first waveguide.

17. A method according to claim 16, wherein the modulator comprises at least one capacitor configured such that the energy corresponding to the potential difference generated by the light sensor is stored on the capacitor, the temperature control unit being connected to the capacitor.

18. A method according to claim 16, wherein the method further comprises
storing a first energy corresponding to the potential difference measured by the light sensor when the first voltage is applied to the first waveguide in a first capacitor, and
storing a second energy corresponding to the potential difference measured by the light sensor when the second voltage is applied to the first waveguide in a second capacitor,
wherein the temperature control unit is separately connected to the first and the second capacitor.

19. A method according to claim 18, further comprising
closing a first switch when the first voltage is applied in order to connect the light sensor to the first capacitor such that the first energy is stored on the first capacitor, and
closing a second switch when the second voltage is applied in order to connect the light sensor to the second capacitor such that the second energy is stored on the second capacitor.

20. A method according to claim 10, wherein the determining the intensity of the light transmitted through the second waveguide after having passed along the first waveguide includes measuring the intensity of the light transmitted by the third waveguide with the light sensor, and transforming that measured intensity to a potential difference.

* * * * *